(12) United States Patent
Ng

(10) Patent No.: US 6,411,956 B1
(45) Date of Patent: Jun. 25, 2002

(54) METHOD FOR DISTRIBUTED TRANSACTION SUPPORT USING JDBC 1.0 DRIVERS

(75) Inventor: Tony Chun Tung Ng, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/333,141

(22) Filed: Jun. 14, 1999

(51) Int. Cl.⁷ .............................................. G06F 17/30
(52) U.S. Cl. ............................ 707/10; 707/4; 707/101; 707/102; 707/104.1
(58) Field of Search ........................... 707/4, 101, 102, 707/103, 104.1, 10; 709/1, 203, 204, 225, 229; 713/156

(56) References Cited

U.S. PATENT DOCUMENTS 6,167,253 A * 12/2000 Farris et al. ................. 455/412
6,256,637 B1 * 7/2001 Venkatesh et al. ........... 707/103

OTHER PUBLICATIONS

Sun Microsystems, In. JDBC (TM) 2.0 API version 1.0 (May 30, 1998) pp. 1–57).*
Overview of the JSQL Architecture, JSQL User Guides Version 3.4 (pp. 1–3) (Internet) (1999).*
Empress JDBC Interface (Internet) by Sun Microsystems (pp. 1–3) no date published, internet Jul. 22, 2001).*
Hamilton et al., "JDBC™: A Java SQL API", Version 1.20, JavaSoft, Inc., Jan. 10, 1997.
White et al., "JDBC™ 2.0 API", Version 1.0, Sun Microsystems, Inc., May 30, 1998.
White et al., "JDBC 2.0 Standard Extension API", Version 1.0, Sun Microsystems, Inc., Dec. 7, 1998.
Susan Cheung, "Java Transaction Service (JTS)", Version 0.95, Sun Microsystems, Inc., Mar. 1, 1999.
Cheung et al., "Java Transaction API (JTA)", Version 1.0.1, Sun Microsystems, Inc., Apr. 29, 1999.

* cited by examiner

*Primary Examiner*—Diane D. Mizrahi
(74) *Attorney, Agent, or Firm*—Beyer Weaver & Thomas, LLP

(57) ABSTRACT

A method is disclosed for providing distributed transaction support functionality using JDBC 1.0 drivers. Instead of creating a new physical database connection for each connection request, an interface driver internally maintains a mapping in a table between a global transaction identifier and the physical database connection. Even if an application requests multiple connections to the same database for the same transaction, all database access through those connections would actually be redirected to the same physical database connection as maintained in the table. This allows all the work to be coordinated under the same transaction. Thus, limited JDBC 2.0 Standard Extension driver compatibility is achieved using standard JDBC 1.0 drivers.

24 Claims, 6 Drawing Sheets

METHOD FOR DISTRIBUTED TRANSACTION SUPPORT USING JDBC 1.0 DRIVERS

BACKGROUND OF THE INVENTION

1. Field of the Invention

The present invention relates generally to transaction support in a distributed object computing environment and more particularly, to a method for distributed transaction support using JDBC 1.0 drivers.

2. Description of the Related Art

Java DataBase Connectivity or JDBC is a generic SQL database access applications program interface (API) for the Java programming language. This API provides a uniform interface to a variety of different database modules, allowing programmers to write a single database interface for accessing a variety of different databases. The original JDBC 1.0 specification has recently been updated by the release of a JDBC 2.0 core API specification, version 1.0, May 30, 1998 and a JDBC 2.0 Standard Extension API specification, version 1.0, Dec. 7, 1998, the disclosures of which are herein incorporated by reference.

As shown in FIG. 1, when a database connection is obtained from a JDBC 1.0 driver, all database accesses done through that connection will be performed by the transaction specific to that connection. For example, if there are three database connections $C_1$, $C_2$, $C_3$ the work done through the three connections will be isolated into three separate, independent transactions $T_1$, $T_2$, $T_3$.

The JDBC 2.0 Standard Extension API defines support for distributed transactions using the standard two-phase commit protocol defined in the Java Transaction API (JTA). This feature allows multiple JDBC connections to multiple databases to be coordinated under the same global transaction. In other words, a series of work by individual components is grouped into one single unit of work, i.e. a single transaction. For example, as illustrated in FIG. 2, with a JDBC 2.0 Standard Extension driver it is possible to obtain multiple database connections $C_4$, $C_5$, $C_6$ such that they are all enlisted in the same global transaction $T_4$. In other words, all the work done through these connections $C_4$, $C_5$, $C_6$ are part of the same global transaction $T_4$.

Support for the JDBC 2.0 Standard Extension API, however, is optional and many databases only provide JDBC 1.0 drivers. The JDBC 1.0 drivers do not include distributed transaction support as defined in the JDBC 2.0 Standard Extension. It would thus be desirable to provide limited distributed transaction support using JDBC 1.0 drivers, without the need for a JDBC 2.0 Standard Extension compatible driver.

SUMMARY OF THE INVENTION

The present invention provides design and implementation of classes that allow the simulation of JDBC 2.0 Standard Extension driver behavior using standard JDBC 1.0 drivers. Instead of creating a new physical database connection for each connection request, an interface driver internally maintains a mapping in a table between a global transaction identifier and the physical database connection. Even if an application requests multiple connections to the same database, all database access through those connections are actually re-directed to the same physical database connection as maintained in the table. This allows all the work to be coordinated under the same transaction.

First, an adapter maintains a table of mappings between global transaction identifiers and associated physical connections. When a component requests a database connection, the component is assigned a virtual connection. When the component attempts to access the connection, the adapter determines whether a physical connection is associated with the component's transaction. If not, a new physical connection is created and the table is updated. The component's virtual connection is then dynamically wired to the physical connection associated with the component's transaction. Thus, the component's access is redirected to the physical connection. From the database point of view, only one physical connection is established and is associated with only one transaction. The work performed by the different components is thereby automatically grouped under the same transaction.

BRIEF DESCRIPTION OF THE DRAWINGS

The present invention will be readily understood by the following detailed description in conjunction with the accompanying drawings, wherein like reference numerals designate like structural elements, and in which:

FIG. 5 (B) illustrates a container configured according to the present invention;

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for distributed transaction support using JDBC 1.0 drivers.

Sun Microsystem's Java 2 Platform Enterprise Edition (J2EE) is a platform for constructing Java technology based multi-tier applications across a distributed, object-oriented enterprise. One specific J2EE-compliant implementation is known as the J2EE Reference Implementation or J2EE RI. The J2EE RI includes an implementation of a Java Transaction Service (JTS) and a Java Transaction API (JTA). The JTS is specified by the Java Transaction Service draft specification, version 0.95, Mar. 1, 1999, and the JTA is specified by the Java Transaction API specification, version 1.0.1, Apr. 29, 1999, both specifications herein incorporated by reference. The JTA specification specifies the high-level interfaces between a Transaction Manager and any other parties involved in a distributed transaction system, such as the application, the resource manager, and the application server.

Figure 1:
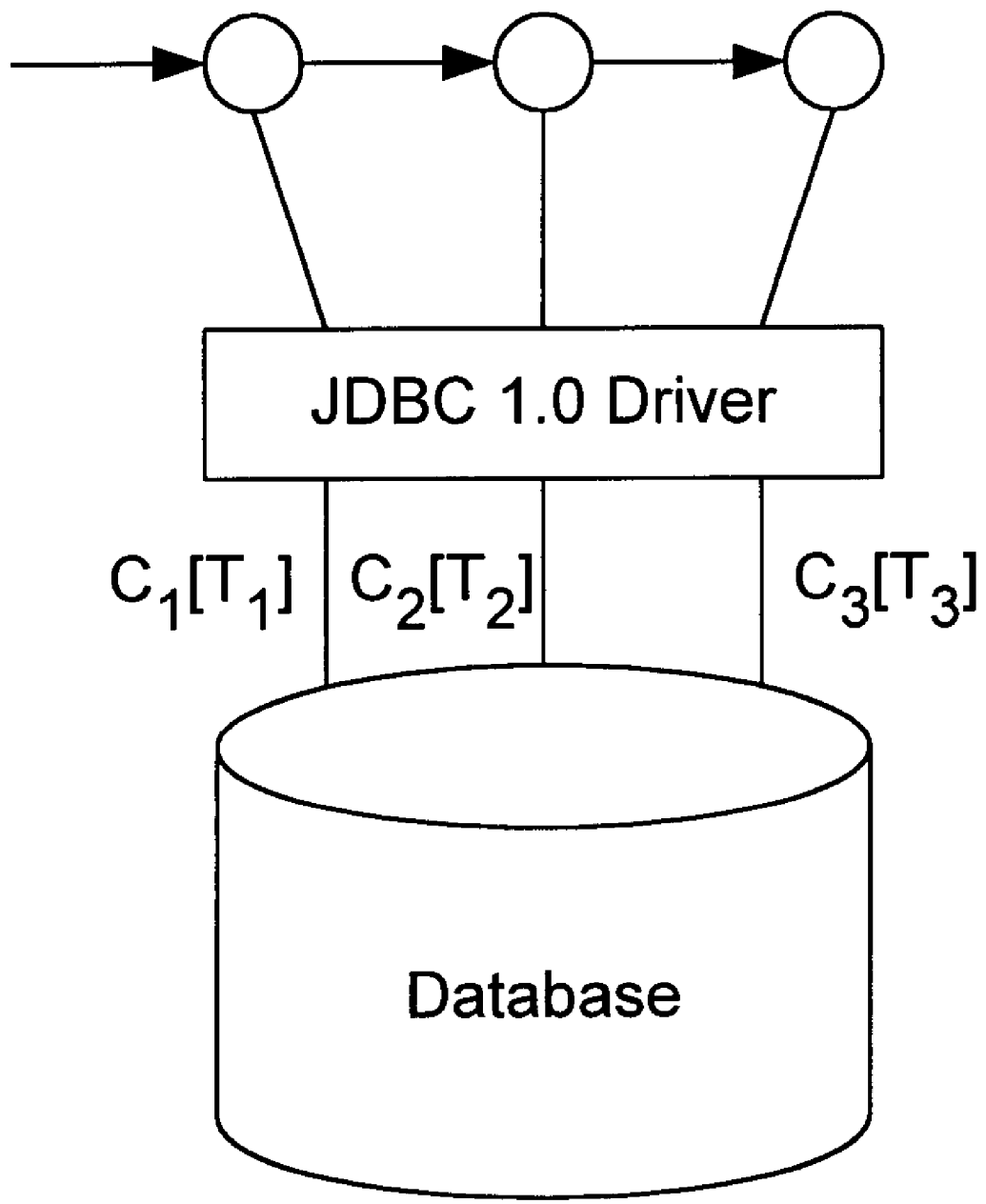
FIG. 1 illustrates database connections made according to a JDBC 1.0 driver.
Figure 2:
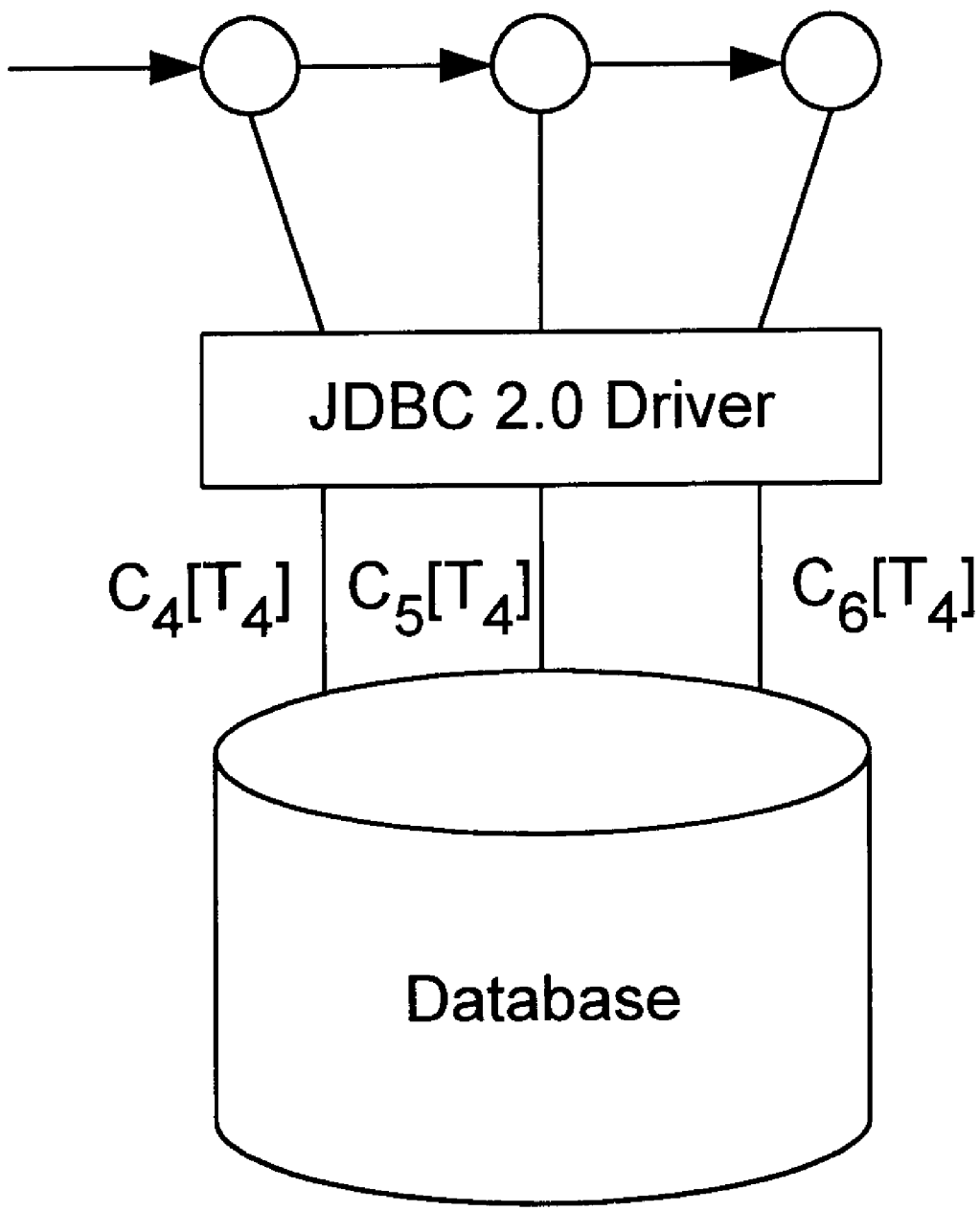
FIG. 2 illustrates database connections made according to a JDBC 2.0 driver.
Figure 3:
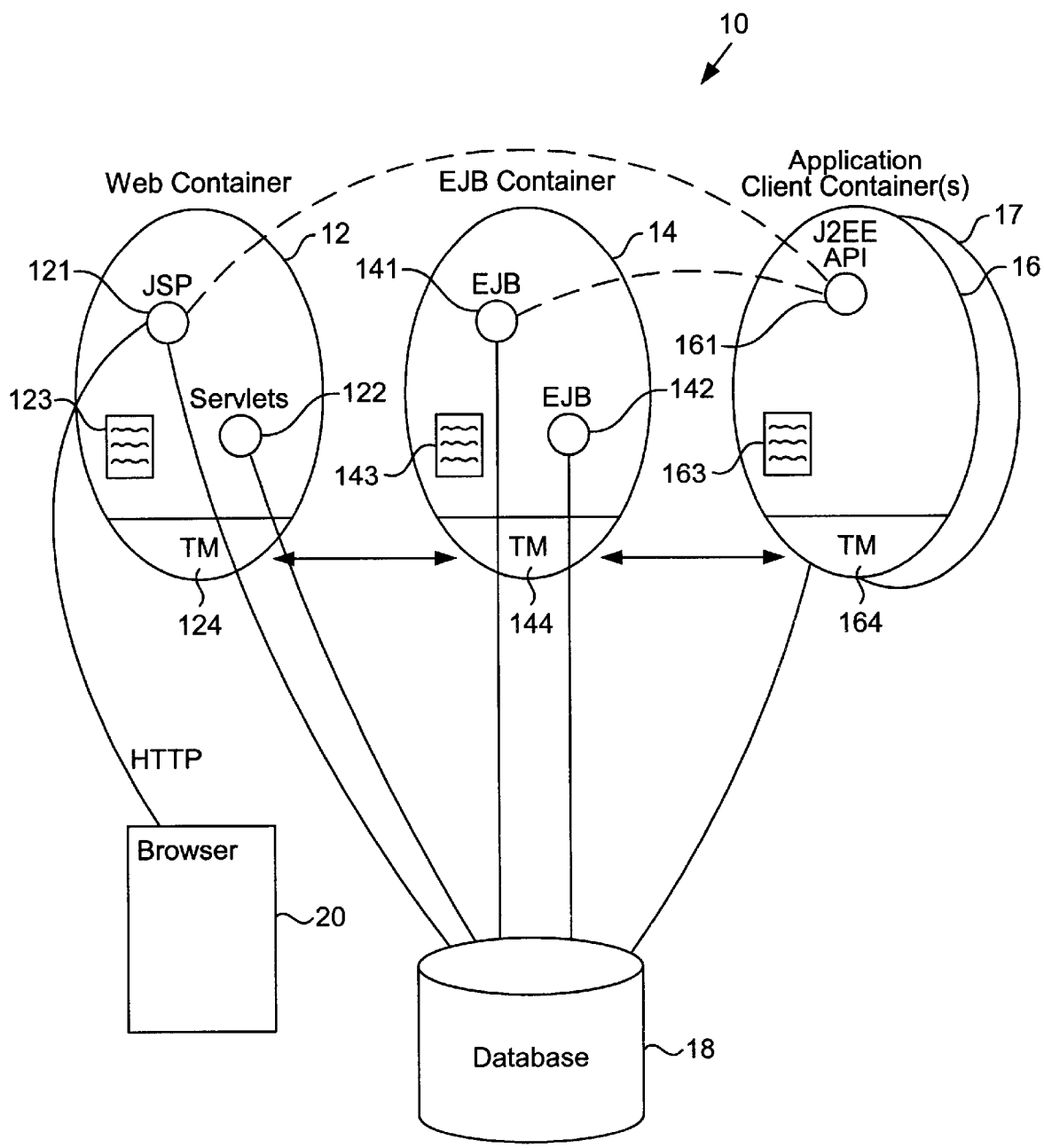
FIG. 3 is a diagram of a typical J2EE RI implementation.

A typical J2EE implementation 10 is illustrated in FIG. 3. The J2EE implementation 10 may be installed on one or more physical machines, as the J2EE standard does not specify any predefined hardware configuration. The standard architecture supports two types of components, Web components and Enterprise Java Bean (EJB) 141, 142 components, and also application clients. The Web components include Java Server Pages (JSP) 121 and servlets 122. The JSP components 121 may be accessed, for example, by a web browser 20 using HTTP. Each type of component is contained within a "Container" 12, 14, 16, 17 which provides an environment within which components or applications run. A J2EE implementation 10 may contain multiples of the same type of containers 16, 17 and the containers may exist in a distributed environment. Individual components can interact with each other across containers or with external databases 18. Each container has its own Transaction Manager 124, 144, 164 to manage transactions within the container. The Transaction Managers can communicate with other Transaction Managers to determine transaction status information.

Figure 4:
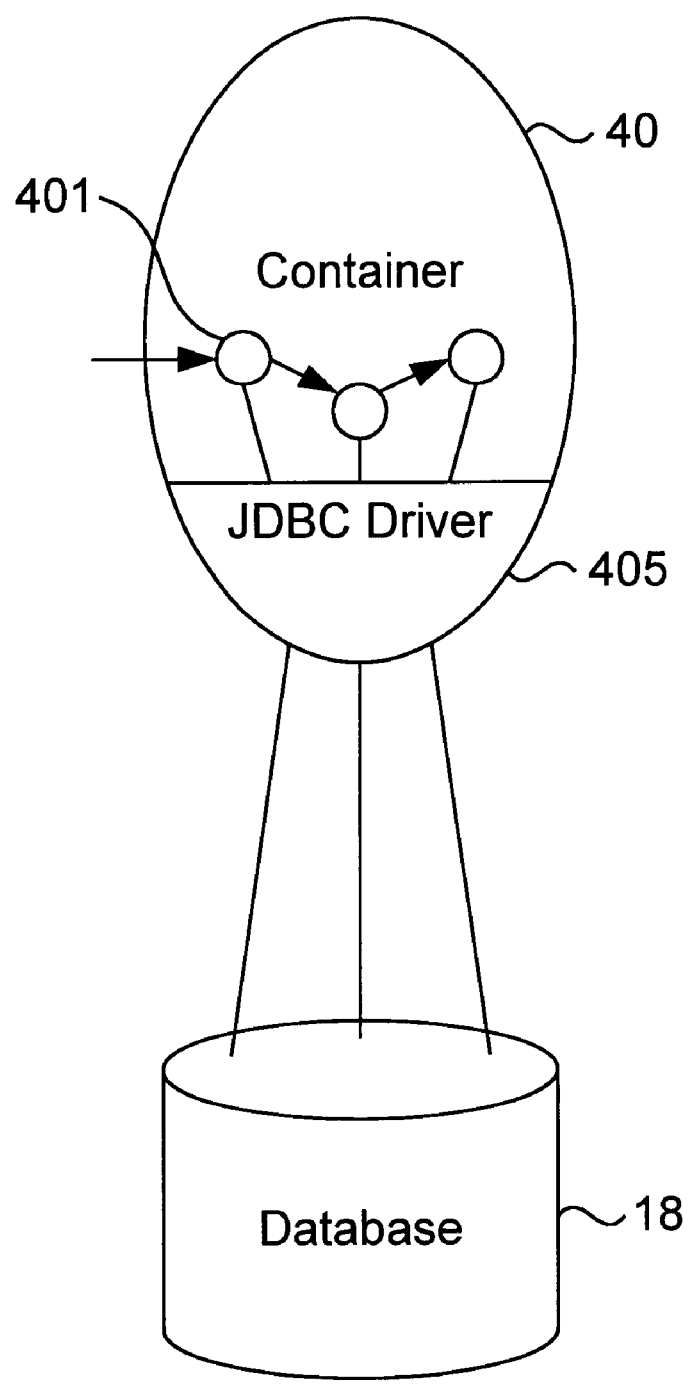
FIG. 4 is illustrating the relationship between a container, components, a JDBC driver and a database.

As illustrated in FIG. 4, each component 401 in a container 40 may open a connection with a database 18 in order to perform some database function. These database requests are handled through a JDBC driver 405. However, as described above, JDBC 1.0 drivers provide that each connection with the database represents an independent transaction. Ideally, all the components working on the same transaction would be able to open a separate connection, but have all the connections associated with the same transaction. One solution is to use a JDBC 2.0 Standard Extension driver, which allows containers to dynamically associate transactions with multiple connections. However, many databases have not provided a commercial JDBC 2.0 driver. Therefore, the present invention provides an interim solution that will provide limited distributed transaction support using existing JDBC 1.0 drivers.

The present invention provides design and implementation of classes that allow the simulation of JDBC 2.0 Standard Extension driver behavior using JDBC 1.0 drivers. As defined herein, the present invention is referred to as a JDBC 2.0 Standard Extension adapter, or simply as an adapter. Instead of creating a new physical database connection for each connection request, the adapter internally maintains a mapping in a table between a global transaction identifier and the physical database connection. Even if an application requests multiple connections to the same database for the same transaction, all database access through those connections would actually be redirected to the same physical database connection as maintained in the table. This allows all the work to be coordinated under the same transaction.

Figure 5A:
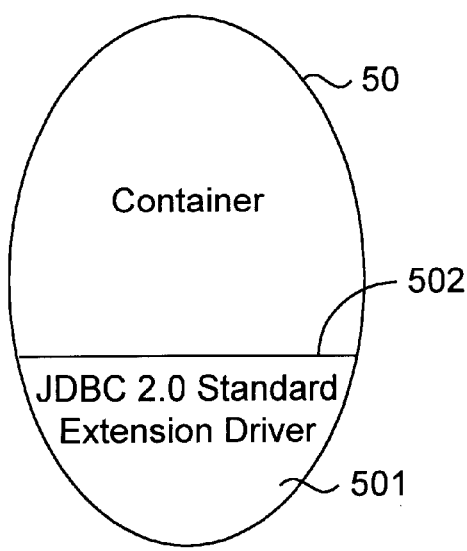
FIG. 5 (A) illustrates a container configured using a JDBC 2.0 driver.
Figure 5B:
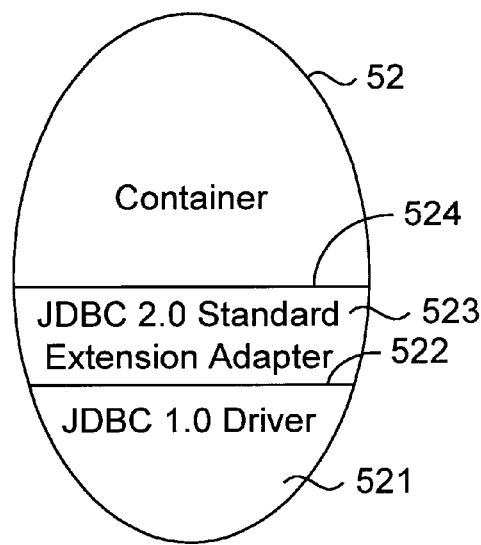

The present invention shields a container from knowing that two different versions of a JDBC driver exist. Specifically, as shown in FIG. 5(A), the container 50 has a JDBC 2.0 Standard Extension driver 501, and therefore, the container sees a JDBC 2.0 Standard Extension API 502. The container 52 in FIG. 5(B), however, has a JDBC 1.0 driver 521. Ordinarily, the container 52 would see a JDBC 1.0 API 522. The present invention, though, includes a JDBC 2.0 Standard Extension adapter 523 to present the same JBBC 2.0 Standard Extension API 524 to the container 52 as seen by the container 50 having a 2.0 driver.

Thus, if the underlying driver is a JDBC 2.0 Standard Extension driver, then there is no problem and the present invention is not implemented. If the driver is 1.0 driver, however, then the adapter 523 extends the functionality of the 1.0 driver to make it behave like a 2.0 driver from the container's perspective, without any specific support from the databases.

Figure 6:
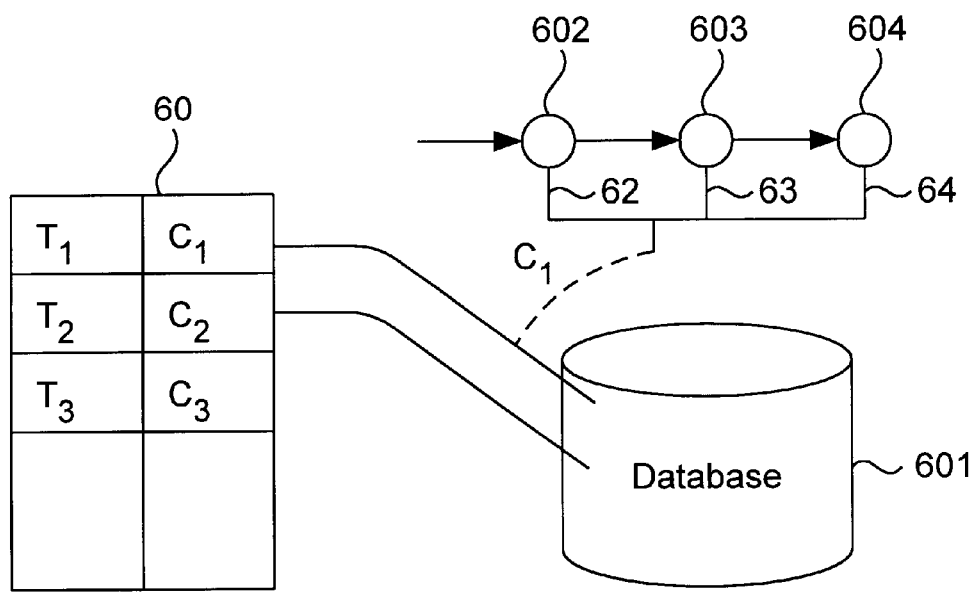
FIG. 6 illustrates a preferred embodiment of the present invention.

The operation of the adapter 523 will know be described with reference to FIG. 6. Instead of immediately opening a connection to the database 601 when a component 602 makes a request, the component is given a connection 62 that is not initially connected to the database 601 (i.e. a "virtual connection"). A separate table 60 is maintained which associates a global transaction identifier with a physical connection to the database. For example, transaction $T_1$ is associated with physical connection $C_1$.

Figure 7:
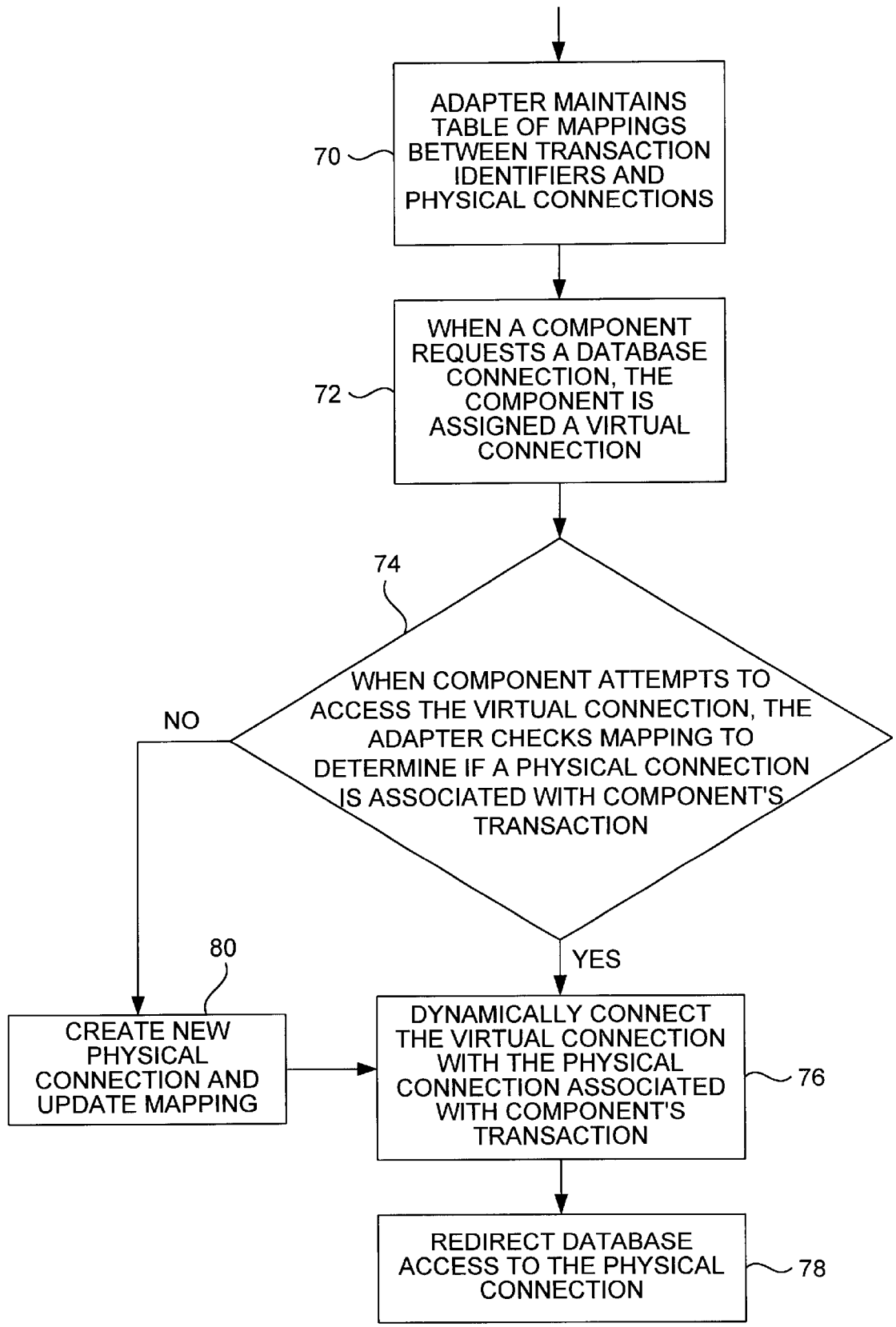
FIG. 7 is a flow chart of the operation of the present invention.

FIG. 7 is a flowchart illustrating the operation of the present invention. First, the adapter 523 maintains a table of mappings between global transaction identifiers and associated physical connections (step 70). When a component requests a database connection, the component is assigned a virtual connection (step 72). When the component attempts to access the virtual connection, the adapter determines whether or not a physical connection is associated with the component's transaction (step 74). If not, a new physical connection is created and the table is updated (step 80). The virtual connection is then dynamically wired (connected) with the physical connection associated with the component's transaction (step 76). The database access is thus redirected to the physical connection (step 78). From the database point of view, only one physical connection is established and is associated with only one transaction. The work performed by the different components is thereby automatically grouped under same transaction.

The present invention is somewhat limited, however. In order for the present invention to work, the components must live in the same process or Java Virtual Machine, otherwise they are unable to share the same physical connection. An actual JDBC 2.0 Standard Extension implementation would not have this restriction. Since not all databases have the capability to support multiple connections for a single transaction, the present invention allows these databases, in a limited way, to achieve the same results without having a sophisticated JDBC driver. By using an interface within the container, the container only needs to understand the 2.0 Standard Extension API, while the databases interact with a 1.0 driver.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for distributed transaction support on a computer system having a database system using a database driver, the method comprising the steps of:
    associating a physical database connection with each transaction;
    assigning a virtual database connection to a component requesting a database connection; and
    associating each virtual database connection with a physical database connection based upon a transaction identifier.

2. The method of claim 1, further comprising the step of:
    dynamically swapping virtual connections associated with a same physical connection, in order to provide database connections for each of the components.

3. The method of claim 2, wherein the database driver is a JDBC 1.0 driver.

4. The method of claim 3, wherein the method provides simulation of JDBC 2.0 Standard Extension driver behavior.

5. The method of claim 4, wherein the step of associating comprises the step of forming a table of transaction and connection relationships.

6. The method of claim 5, wherein the method is implemented as an adapter which can interface to a JDBC 1.0 driver.

7. The method of claim 6, wherein the adapter provides a JDBC 2.0 API interface as viewed by a container.

8. The method of claim 7, wherein all the components associated with a transaction are on the same process or Java Virtual Machine (JVM).

9. The method of claim 8, wherein the computer system is a Java 2 Platform Enterprise Edition (J2EE) system.

10. In a computer system database driver adapter, a method for associating multiple database connections with a single transaction, the method comprising the steps of:

associating a physical database connection with each transaction by forming a table of transaction and physical connection relationships;

assigning a virtual database connection to a component requesting a database connection, associating each virtual database connection with a physical database connection based upon a transaction identifier stored in the table; and dynamically swapping virtual connections associated with a same physical connection, in order to provide database connections for the components.

11. The method of claim 10, wherein the adapter provides simulation of JDBC 2.0 Standard Extension driver behavior.

12. The method of claim 11, wherein the adapter can interface to either a JDBC 1.0 driver.

13. The method of claim 12, wherein the adapter provides a JDBC 2.0 API interface as viewed by a container.

14. The method of claim 13, wherein n all the components associated with a transaction are on the same process or Java Virtual Machine (JVM).

15. The method of claim 14, wherein the computer system is a Java 2 Platform Enterprise Edition (J2EE) system.

16. A method for simulating JDBC 2.0 Standard Extension driver behavior using a standard JDBC 1.0 driver, the method comprising the steps of:

creating a mapping in a table between global transaction identifiers and physical database connections; and redirecting all database connection requests associated with a global transaction identifier through the same physical database connection as maintained in the table.

17. The method of claim 16, wherein the step of redirecting comprises the steps of:

assigning a virtual connection to a component requesting a database connection; and associating each virtual database connection with a physical database connection based upon the transaction identifier of the component.

18. The method of claim 17, further comprising the step of:

dynamically swapping virtual connections associated with a same physical connection, in order to provide database connections for each of the components.

19. A distributed transaction support system on a computer having a database, said distributed transaction support system being configured to:

associate a physical database connection with each transaction;

assign a virtual database connection to a component requesting a database connection, and associate each virtual database connection with a physical database connection based upon a transaction identifier.

20. A distributed transaction support system as recited in claim 19, wherein the database driver is a JDBC 1.0 driver.

21. A distributed transaction support system as recited in claim 19, wherein said distributed transaction support system simulates JDBC 2.0 Standard Extension driver behavior.

22. A computer readable media including computer program code; said computer readable media comprising:

computer program code for associating a physical database connection with each transaction;

computer program code for assigning a virtual database connection to a component requesting a database connection; and computer program code for associating each virtual database connection with a physical database connection based upon a transaction identifier.

23. A distributed transaction support system on a computer having a database, said distributed transaction support system being configured to:

associate a physical database connection with each transaction;

assign a virtual database connection to a component requesting a database connection;

associate each virtual database connection with a physical database connection based upon a transaction identifier; and dynamically swap virtual connections associated with a same physical dynamically swapping virtual connections associated with a same physical connection, in order to provide database connections for each of the components.

24. A computer readable media including computer program code; said computer readable media comprising:

computer program code for associating a physical database connection with each transaction;

computer program code for assigning a virtual database connection to a component requesting a database connection;

computer program code for associating each virtual database connection with a physical database connection based upon a transaction identifier; and computer program code for dynamically swapping virtual connections associated with a same physical connection, in order to provide database connections for each of the components.

* * * * *